United States Patent
Khan

(10) Patent No.: US 12,152,710 B2
(45) Date of Patent: Nov. 26, 2024

(54) CABLE MANAGEMENT SYSTEMS AND METHODS

(71) Applicant: Mohammed Salahuddin Khan, Lake Forest, IL (US)

(72) Inventor: Mohammed Salahuddin Khan, Lake Forest, IL (US)

(*) Notice: Subject to any disclaimer, the term of this patent is extended or adjusted under 35 U.S.C. 154(b) by 152 days.

(21) Appl. No.: 17/862,180

(22) Filed: Jul. 11, 2022

(65) Prior Publication Data

US 2023/0012633 A1    Jan. 19, 2023

Related U.S. Application Data

(60) Provisional application No. 63/221,226, filed on Jul. 13, 2021.

(51) Int. Cl.
*F16L 3/22* (2006.01)
*F16L 3/10* (2006.01)
*G02B 6/06* (2006.01)
*G02B 6/44* (2006.01)

(52) U.S. Cl.
CPC ............ *F16L 3/222* (2013.01); *F16L 3/1058* (2013.01); *G02B 6/06* (2013.01); *G02B 6/4439* (2013.01)

(58) Field of Classification Search
CPC .......... F16L 3/222; F16L 3/1058; G02B 6/06; G02B 6/4439; G02B 6/4471
USPC ........................................ 248/68.1; 211/59.4
See application file for complete search history.

(56) References Cited

U.S. PATENT DOCUMENTS

| | | | |
|---|---|---|---|
| RE26,011 E * | 5/1966 | Girard | F16L 3/222 248/68.1 |
| 3,489,847 A | 1/1970 | Netzel | |
| 3,667,101 A | 6/1972 | Kloth | |
| 4,366,939 A | 1/1983 | McMillan | |
| 4,769,876 A | 9/1988 | Platt | |
| 5,123,547 A * | 6/1992 | Koch | F16L 3/2235 248/68.1 |
| 5,791,607 A * | 8/1998 | Thibault | F16L 3/221 403/381 |
| 6,261,037 B1 * | 7/2001 | Richards | F16L 3/2235 410/36 |

(Continued)

FOREIGN PATENT DOCUMENTS

CN       202056413 U    11/2011

*Primary Examiner* — Muhammad Ijaz
(74) *Attorney, Agent, or Firm* — The Law Offices of Konrad Sherinian, LLC; Depeng Bi

(57) ABSTRACT

A cable management system including a plurality of separably interconnectable clips. Each clip has a plurality of longitudinally extending cells, the cells forming cable channels having open longitudinal ends and an open bottom side, the cable channels arranged side-by-side in a one-dimensional array. Each cell is adapted and configured to receive and retain a corresponding cable of a slightly smaller diameter than that of its cable channel. The clips interconnect in a vertically stacked series to form a clip stack, the one-dimensional cable channel arrays of the clips in the clip stack thus being arrayed vertically to form a two-dimensional cable channel array. Cells without a clip connected below retain corresponding cables with a clearance to permit longitudinal sliding. Cables retained in a clip with a clip connected below are clamped between the cells that retain them and impinging contact regions of a top side of the below clip.

13 Claims, 6 Drawing Sheets

(56) References Cited

U.S. PATENT DOCUMENTS

| | | | |
|---|---|---|---|
| D485,161 S * | 1/2004 | Hutchinson | D8/383 |
| 7,205,481 B2 | 4/2007 | Higbie | |
| 7,600,721 B2 | 10/2009 | Vermeer et al. | |
| 9,951,889 B2 * | 4/2018 | Reed | F16B 23/00 |
| 10,472,145 B2 * | 11/2019 | Lu | B65D 61/02 |
| 10,944,355 B2 * | 3/2021 | Jette | F16L 3/2235 |
| 2009/0179119 A1 | 7/2009 | Wallingford et al. | |
| 2009/0224111 A1 * | 9/2009 | Gilbreath | F16L 3/222 |
| | | | 248/68.1 |
| 2009/0293233 A1 * | 12/2009 | Ho | F16L 3/223 |
| | | | 24/571 |
| 2017/0089495 A1 | 3/2017 | Gundel et al. | |
| 2019/0178420 A1 | 6/2019 | Etheridge et al. | |

* cited by examiner

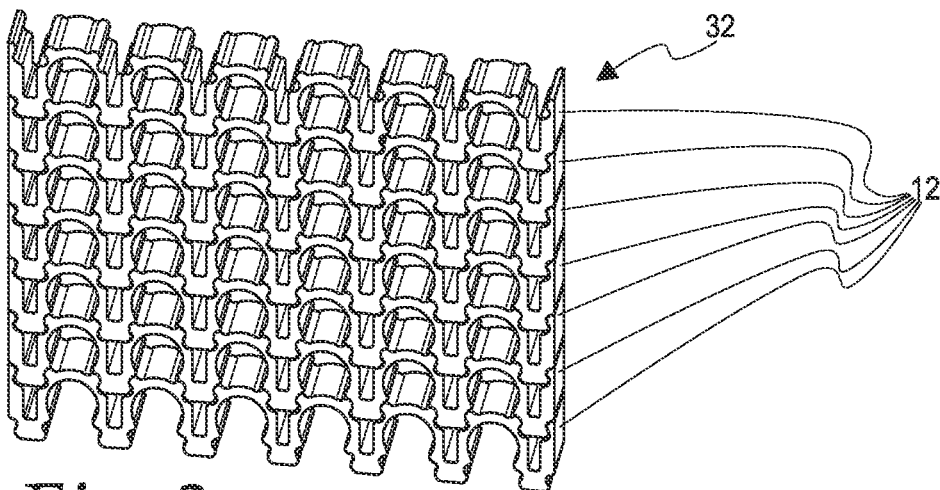
Fig. 3
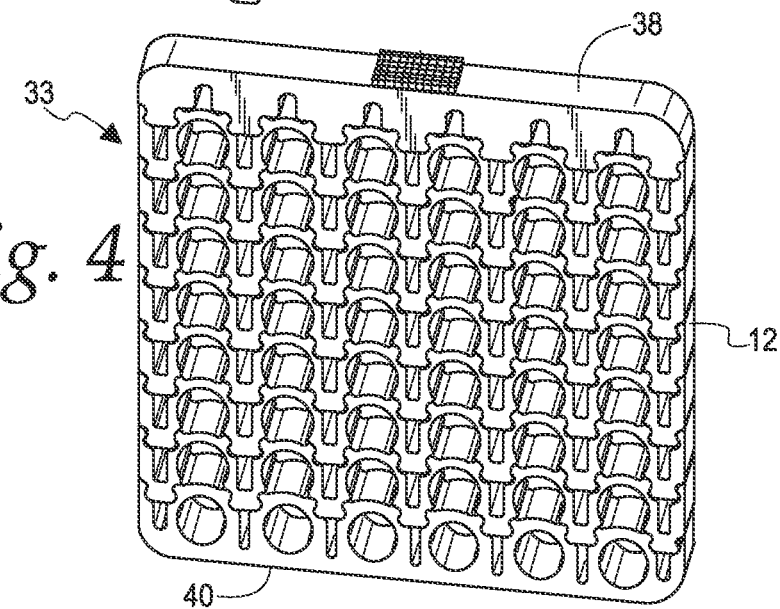
Fig. 4
Fig. 5A
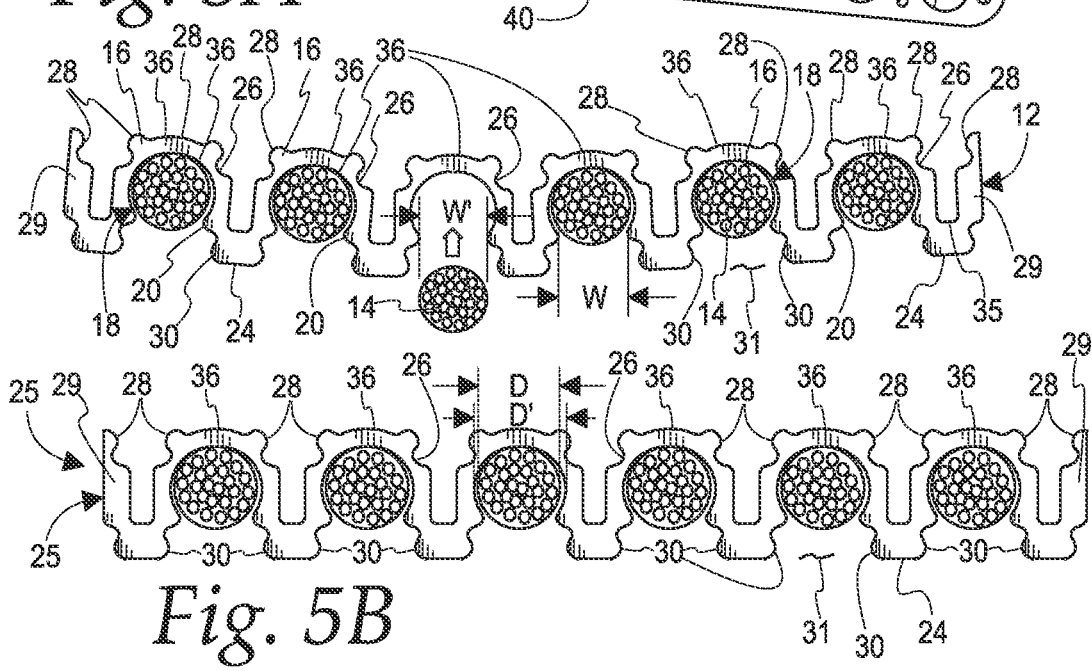
Fig. 5B

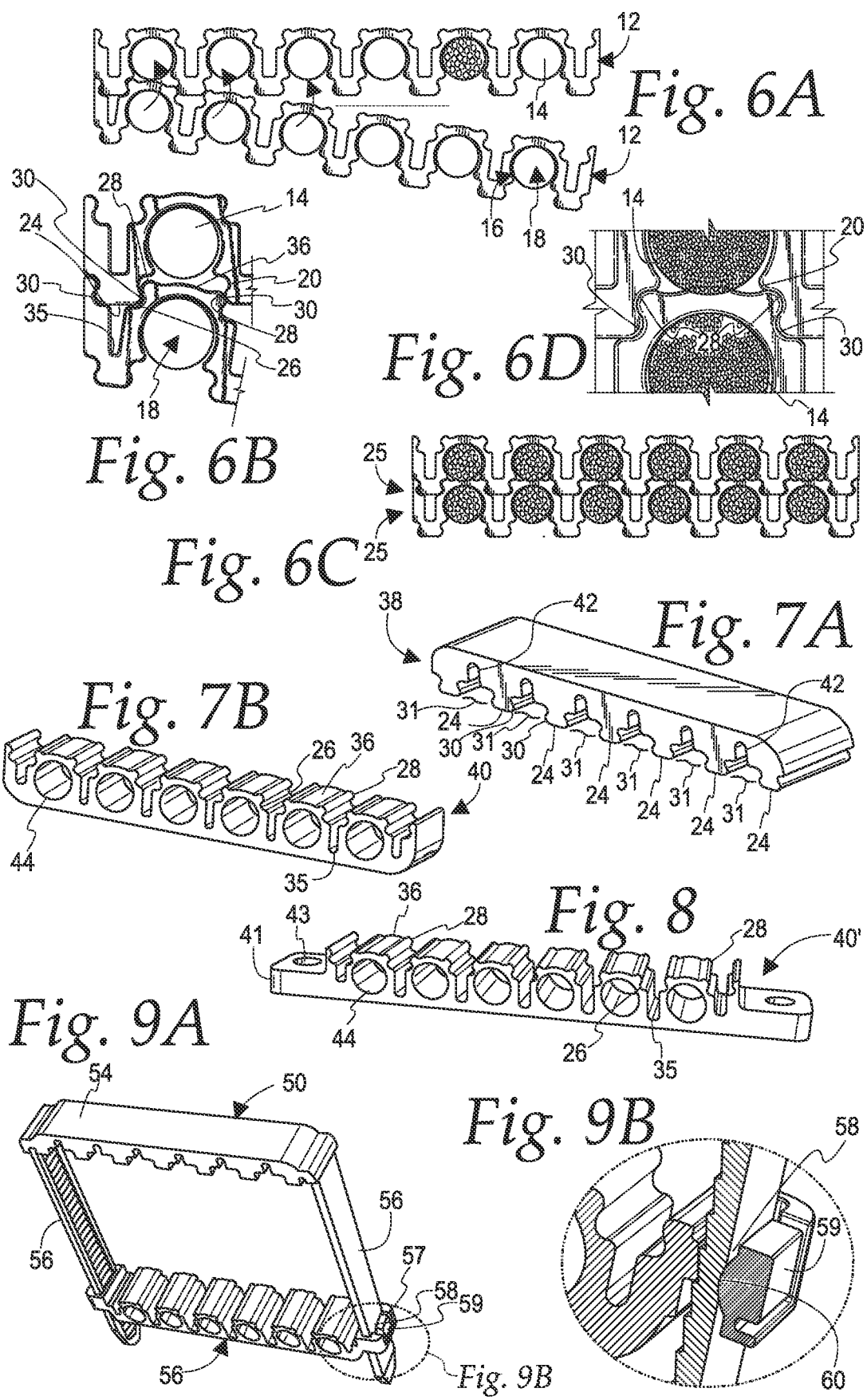

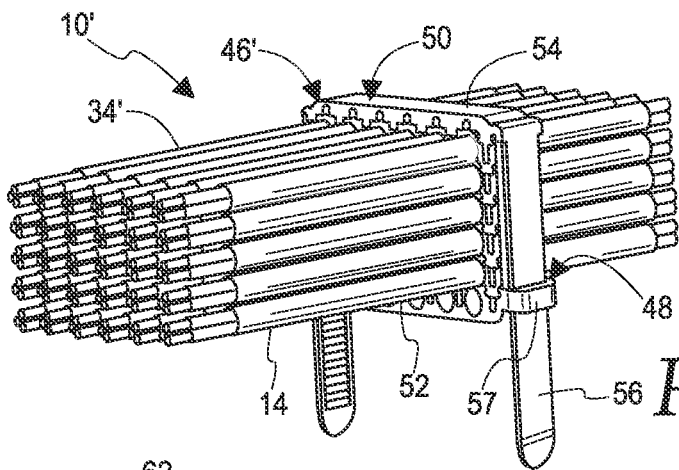
Fig. 10
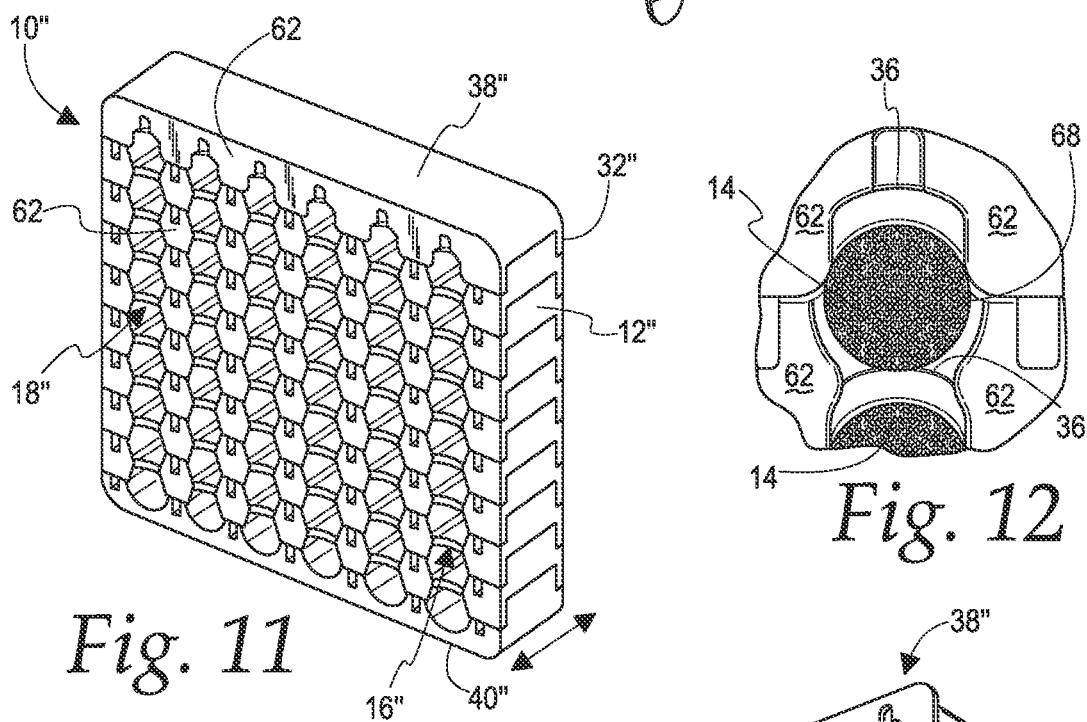
Fig. 11
Fig. 12
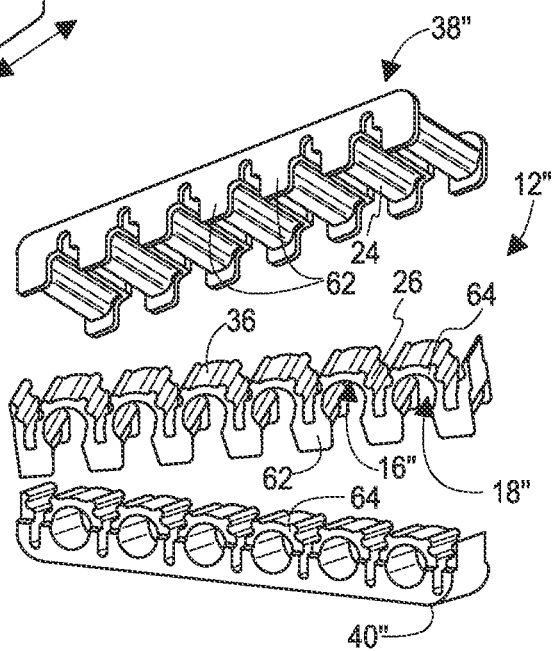
Fig. 13

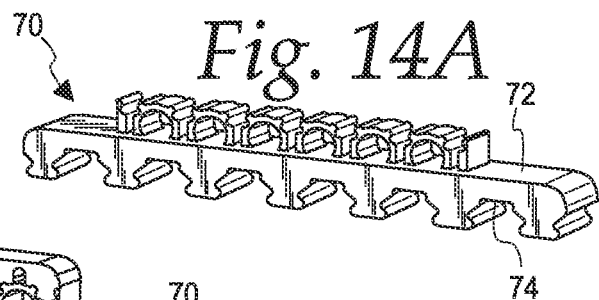
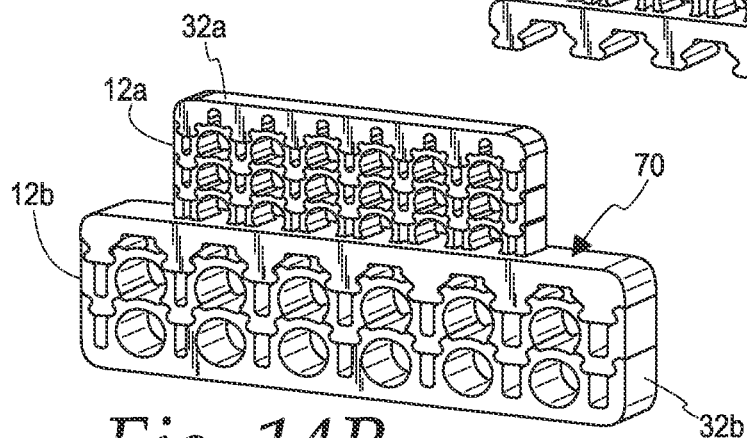
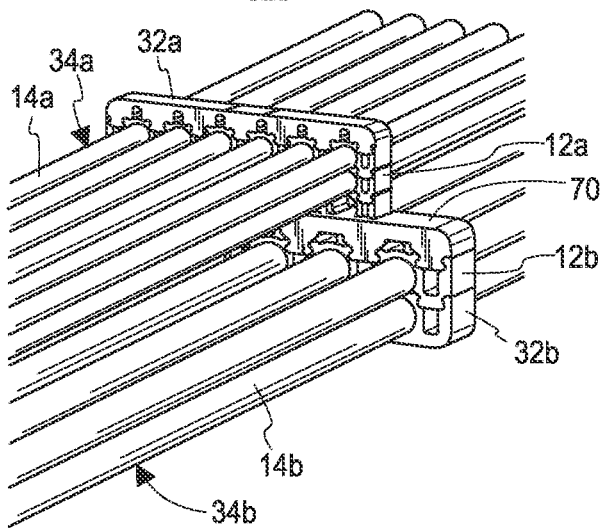
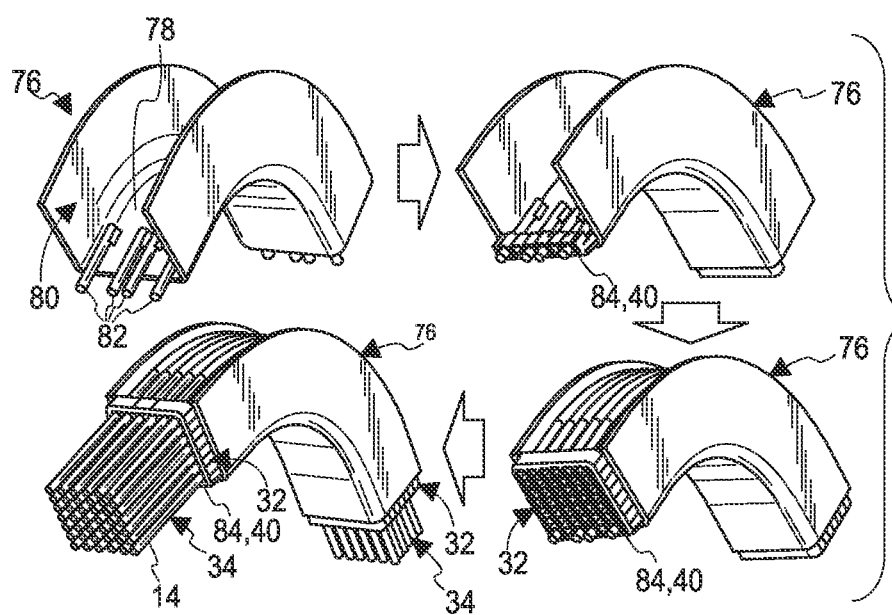

CABLE MANAGEMENT SYSTEMS AND METHODS

CROSS REFERENCE TO RELATED APPLICATION(S)

This application claims the benefit of U.S. provisional application No. 63/221,226, filed Jul. 13, 2021 and entitled CABLE MANAGEMENT SYSTEMS AND METHODS, which is incorporated herein for all purposes in its entirety.

FIELD OF THE DISCLOSURE

The present disclosure relates to management systems and methods for bundles of cables. More particularly, it relates to systems and methods for aligning and retaining fiber-optic cable bundles. More particularly, it relates to modular systems and methods for aligning, retaining, and mounting cable bundles to racks and/or locally flat support surfaces.

BACKGROUND

Cable management has been an issue as long as multiple systems have needed interconnecting. With its reduced effectiveness in tight bending situations, optical fiber has brought new challenges. The large number of fibers typical of most configurations coupled with physical constraints such as bend radius makes serving the needs of fiber in a compact volume even more difficult.

Cable management presents characteristic challenges in different applications. On a macro level these include large buildings, transportation systems, homes. On a micro level, cable management challenges abound inside electronic products.

One area where cable management is especially challenging is in midsized custom configured rack-mounted systems of low to modest volumes (including one-offs). Developers and users alike have come up with both products and design strategies that help manage the problem. But often these are time consuming and frequently degenerate as modifications are made during a system's lifetime.

Fiber-optic cable management presents its own characteristic challenges in particular because of the need to maintain bends at above a minimum cable bend radius. Optical fiber functions through the mechanism of TIR (total internal reflection) for a light beam to bounce of the inside surface of a glass fiber (or plastic) filament. This function is impaired if the radius is too tight both because of potential cracking in the light transmitting medium and due to the geometry of the light rays in relation to the internal surface angles of a fiber. For commercially deployed optical fiber, a bend radius of not less than 30 mm has been demanded, and sometimes 50 mm, although these values have been reducing as newer technology fiber-optic cables allow somewhat tighter bends.

SUMMARY OF THE DISCLOSURE

The present disclosure provides modular cable alignment and retention systems and methods for bundles of cables. While particularly beneficial for aligning and retaining fiber-optic cable bundles, such as bundles mounted in racks or to locally flat support surfaces, the systems and methods are applicable to other types of cables, such as those used in networking and interfacing electronic systems or in other applications, as well as to other routed components such as densely bundled tubing, and piping, whether flexible or rigid.

According to an aspect of the disclosure, a cable management system comprises a plurality of separably interconnectable clips. Each clip includes a one-piece clip body, the clip body having a first lateral end, a second lateral end, a first longitudinal end, a second longitudinal end, a top side, and a bottom side, the clip extending in a lateral dimension from the first lateral end to the second lateral end, the clip extending in a longitudinal dimension from the first longitudinal end to the second longitudinal end, the clip extending in a vertical dimension from the bottom side to the top side, the lateral, longitudinal, and vertical dimensions being orthogonal to one another. Each clip includes a plurality of cells, the plurality of cells forming a corresponding plurality of cable channels, each of the cells having a cell wall extending over a length and around a portion of a perimeter of the corresponding cable channel. The cable channels are spaced apart along the lateral dimension in a one-dimensional cable channel array, each of the cable channels having a cable channel axis extending in the longitudinal dimension and a cable channel diameter perpendicular to the cable channel axis, the cable channel axis defining radial directions perpendicular to the cable channel axis, and each cable channel having a peripheral opening on the bottom side of the clip. Each cell is adapted and configured to receive a corresponding cable, the corresponding cable having a corresponding cable diameter corresponding to the cable channel diameter. The clips are interconnectable in a vertically stacked series to form a clip stack comprising a top clip and at least one successively lower clip, a top side of each successively lower clip of the stack being connected to a bottom side of a preceding higher clip of the stack, the one-dimensional cable channel arrays of the clips in the clip stack being spaced apart vertically along the vertical dimension to form a two-dimensional cable channel array, the top side of each successively lower clip in the stack comprising a plurality of contact regions corresponding to the plurality of cells of the preceding higher clip, each contact region of the successively lower clip cooperating with the corresponding cell of the preceding higher clip such that, when the corresponding cable is retained in the corresponding cable channel of the preceding higher clip, the cable is frictionally gripped between the contact region and the corresponding cell.

BRIEF DESCRIPTION OF THE DRAWINGS

Although the characteristic features of this disclosure will be particularly pointed out in the claims, the disclosed method and system, and how it may be made and used, may be better understood by referring to the following description taken in connection with the accompanying drawings forming a part hereof, wherein like reference numerals refer to like parts throughout the several views and in which:

FIG. 3 is a perspective view of a clip stack formed of interconnected clips as shown in FIG. 2.

FIG. 4 is a perspective view of a clip stack as in FIG. 3, further finished with top and bottom caps.

FIG. 5A is a front elevational view illustrating the snap insertion of a cable into the clip shown in FIG. 2.

FIG. 5B is a front elevational view illustrating the clip shown in FIG. 2 retaining a plurality of cables.

FIG. 6A is a front elevational view illustrating the snap connection of an unpopulated clip as in FIG. 2, below an identical clip populated with cables.

FIG. 6B is an enlarged partial front elevational view of a pair of clips being snapped together according to the procedure illustrated in FIG. 6A.

FIG. 6C is a front elevational view illustrating a pair of clips completely snapped together.

FIG. 6D is an enlarged partial front elevational view illustrating more clearly the snapped arrangement of a pair of cells, one from each clip, and the role of the convex form of the lower clip forming an interference fit with the cable contained in that cell of the upper clip that lies immediately above it.

FIG. 7A is a perspective view of a top cap according to an embodiment.

FIG. 7B is a perspective view of a bottom cap according to an embodiment.

FIG. 8 is a perspective view of a surface mounting bottom cap according to an embodiment.

FIG. 9A is a perspective view of a clip stack binding frame according to an embodiment.

FIG. 9B is an enlarged cross-sectional partial view of a locking connection mechanism of the clip stack binding frame shown in FIG. 9A.

FIG. 10 is a perspective view of a heavy-duty cable management system according to an embodiment, using the clip stack binding frame shown in FIG. 9A.

FIG. 11 is a perspective view of a flanged clip stack according to an embodiment.

FIG. 12 is an enlarged partial view of a cable retained in a cell of the flanged clipped stack shown in FIG. 11.

FIG. 13 is an exploded view of components of the flanged clip stack shown in FIG. 11.

FIG. 14A is a perspective view of a clip stack adapter cap according to an embodiment.

FIG. 14B is a perspective view of clip stacks of different sizes interconnected by the clip stack adapter cap shown in FIG. 14A.

FIG. 14C is a perspective view of a multi-cable diameter clip management system utilizing the clip stack adapter cap shown in FIG. 14A.

FIG. 15 is an illustration of the routing of a cable bundle through a waterfall bend tray accessory according to an embodiment.

A person of ordinary skills in the art will appreciate that elements of the figures above are illustrated for simplicity and clarity and are not necessarily drawn to scale. The dimensions of some elements in the figures may have been exaggerated relative to other elements to help to understand the present teachings. Furthermore, a particular order in which certain elements, parts, components, modules, steps, actions, events and/or processes are described or illustrated may not be required. A person of ordinary skills in the art will appreciate that, for simplicity and clarity of illustration, some commonly known and well-understood elements that are useful and/or necessary in a commercially feasible embodiment may not be depicted to provide a clear view of various embodiments per the present teachings.

DETAILED DESCRIPTION

In the following description of various examples of embodiments of the disclosed system and method, reference is made to the accompanying drawings, which form a part hereof, and in which are shown by way of illustration various example devices, systems, and environments in which aspects of the disclosed system and method can be practiced. Other specific arrangements of parts, example devices, systems, and environments, can be used, and structural modifications and functional modifications can be made without departing from the scope of the disclosed system and method.

Figure 1A:
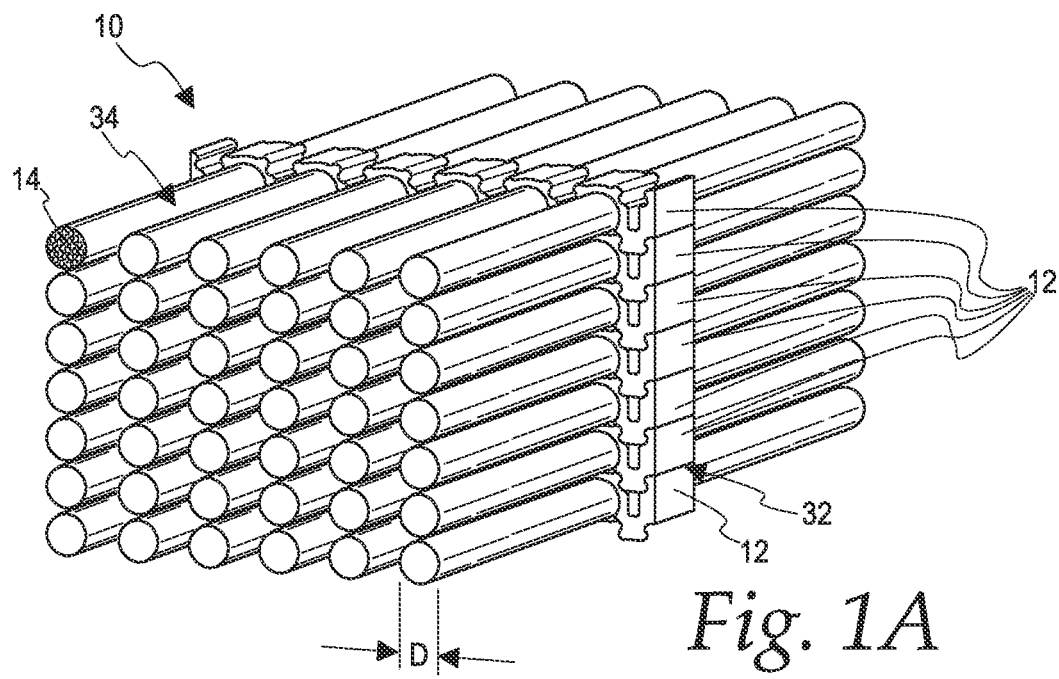
FIG. 1A is a perspective view of a cable management system according to an embodiment.
Figure 1B:
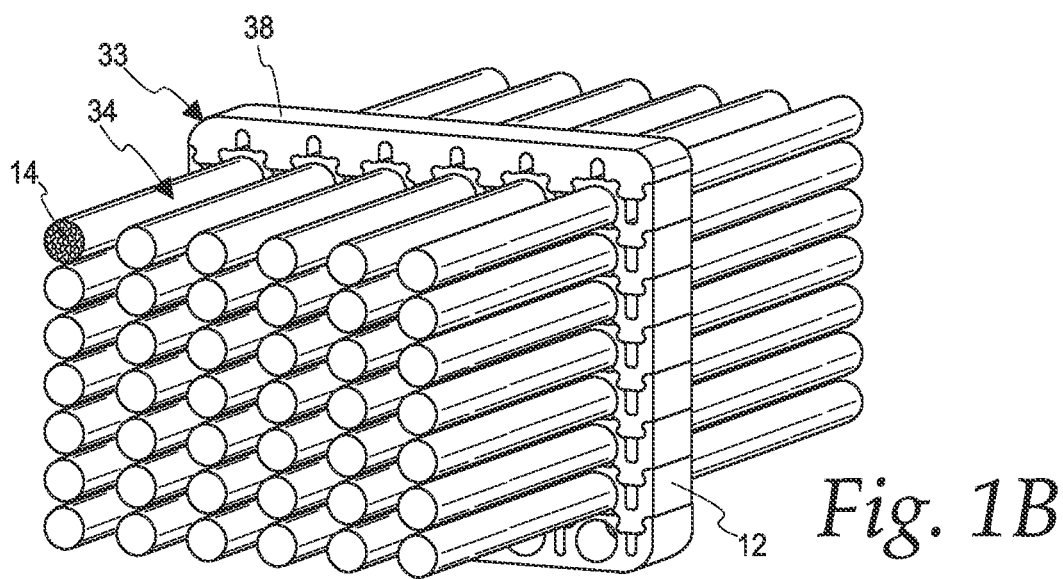
FIG. 1B is a perspective view of the cable management system of FIG. 1A, further illustrating clip stack finishing caps.

Described and illustrated in the present disclosure are cable management systems and methods that address bundles of fiber optic wires and cables mounted on standard racks and/or to flat support surfaces, but the systems and methods are applicable to arranging and securing other types of cable bundles and applications, such as metal conductor wire, flexible tubing, and piping. As shown in FIGS. 1A and 1B and described in further detail below, a cable management system 10 comprises a modular interlocking assembly of wire retention clips 12, a top cap 38, and a bottom cap 40. As described in more detail below, the clips 12 are interconnected to form a clip stack 32, which may be capped by the top cap 38 and bottom cap 40 to form a finished clip stack 33. Various accessories for use in conjunction with clips and clip stacks are further illustrated and described with reference to FIGS. 16-19.

Figure 2:
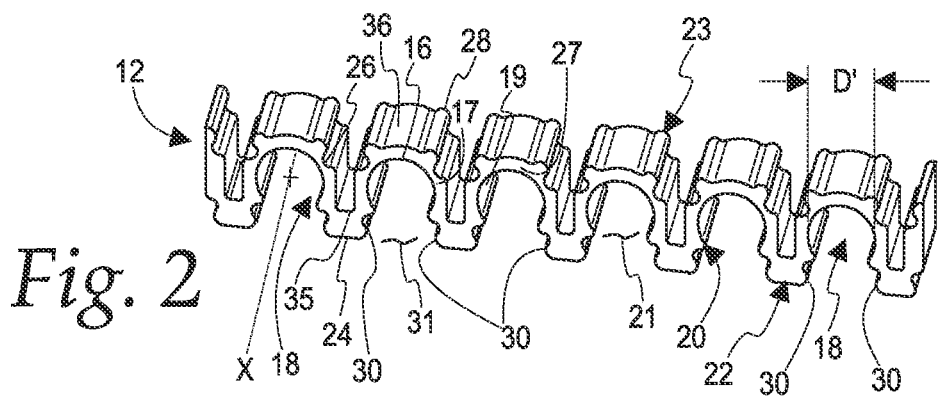
FIG. 2 is a perspective view of a cable retention clip according to an embodiment.

As shown, for example, in FIG. 2, each clip 12 comprises a plurality of cable/wire retention cells 16 for aligning and retaining a corresponding plurality of adjacent wires or cables 14 (for ease of reference, the term "cable" is used hereinafter to mean either a single wire or a plurality of wires bundled together). The cells 16 form generally round cable channels 18, each cable channel 18 having a longitudinal channel axis X. The channel axis X defining a horizontal longitudinal dimension (or "length") of the clip 12, the longitudinal dimension being orthogonal to the lateral dimension. Each channel 18 has openings at its opposite longitudinal ends and a peripheral opening permitting snap insertion of a corresponding cable 14 in a generally radially inward direction (towards the channel axis X). More particularly, each cell 16 has a cell wall 17 including an inner peripheral surface 19, the peripheral surface 19 extending longitudinally over the length of the cable channel 18 and circumferentially about the channel axis X. Still more particularly, the peripheral surface 19 extends more than one-hundred eighty degrees about the channel axis X. The inner peripheral surface 19 has a pair of opposed circumferential ends, the circumferential ends being spaced apart to form the peripheral opening, which is described in more detail below as the jaw opening 21. Together, the inner peripheral surface 19 and the jaw opening 21 circumscribe a perimeter of the cable channel 18 extending three-hundred sixty degrees around the channel axis X.

The cable channels 18 are spaced apart along a lateral (or width) dimension of the clip 12 in a one-dimensional array, with generally uniform center-to-center spacing between neighboring cable channels 18 and between like features of neighboring cells 16. Each cable channel 18 has a channel diameter D', the channel diameter D' corresponding to a nominal cable diameter D, the clip 12 having a length in the longitudinal dimension of typically about 2-4 times, or more particularly about 2½ times the cable diameter D. More particularly, the channel diameter D' is the same for each channel 18 of a clip 12. The cable diameter D may, for example, be one of a plurality of standard cable diameters, such as 3, 4, 5, or 6 millimeters. The channel diameter D' is slightly greater than the cable diameter D, to provide sufficient clearance so as to accommodate a corresponding cable 14 in the cable channel 18 snugly, but without interference between the cable 14 and an inner peripheral surface of the cell 16 of an unassembled clip 12, so as to permit sliding of the cable 14 in a longitudinal direction within the cable channel 18 of the unassembled clip 12 with relatively little frictional resistance. The clip 12 extends from a bottom side 22 to a top side 23 in a vertical (or height) dimension, the vertical dimension being orthogonal to the lateral dimension and orthogonal to the longitudinal dimension. In addition, unless otherwise specified, the term "orthogonal" refers to a direction or feature lying in a plane perpendicular to the axes of the cable channels 18.

Clips according to the disclosed systems and methods are generally of one-piece construction and may, for example, be extruded from polypropylene or other suitable material. Desirable properties of suitable materials may include extrudability, low friction, heat resistance (such as at temperatures up to about 55° C., typical of wire bundle mounting locations), flame retardation, sufficient flexibility for manual snap fitting of cables within cells 16 as well as manual snap-connection and peel-apart separation of adjacent clips 12, and sufficient stiffness (e.g., having a high enough modulus of elasticity or "Young's modulus") for clips 12 to remain intact and assembled in a stacked configuration while bearing loads typical of ordinary mounting conditions. Other suitable materials for the clip 12 may include ABS, high impact polystyrene, HDPE, and polycarbonate as well as certain types of composite materials such as resin-transfer-molded carbon fiber. Clips according to the disclosed systems and methods are made available in different sizes to accommodate different calibers and diameters of cable or wire, such as 3, 4, 5, 6, 8, 10, and 12 millimeters and standard wire gauges such as AWG (American Wire Gauge). In an embodiment, clips 12 and their corresponding size-matched accessories are color coded for cable/wire size.

In methods according to the present disclosure, the cable 14 is typically snapped into the cell 16 in a cable insertion direction orthogonal to the axis (e.g., a radial direction perpendicular to the axis) of the corresponding cable channel 18, as illustrated in FIGS. 5A-5B. As shown in FIG. 5A, a jaw 20 of each cell 16, formed on a lower side 22 of the clip 12, defines a jaw opening 21 having a transverse width w in a relaxed state of the cell 16, the width w being slightly smaller than the cable diameter D, so as to permit snapping the cable 14 into the cable channel 18 while resisting and generally preventing inadvertent escape of the cable 14 from the cable channel 18 in an orthogonal direction generally opposite the cable insertion direction. As shown in FIG. 5A, the cell 16 may be flexed so as to widen the jaw opening 21 to an expanded width w' permitting a snapping or clearance insertion of the cable 14 into the cell 16. Such flexing of the cell 16 may passively result from the cable 14 bearing against the opposite sides of the jaw 20 during insertion, or a user may actively grasp and bend the clip 12 prior to pushing the cable 14 into the cell 16, to facilitate insertion with less force applied to the cable 14 in the cable insertion direction. Inserting cables 14 into a plurality of cells 16 thus forms a row 25 as shown in FIG. 5B, the row 25 comprising a clip 12 and the corresponding one-dimensional array of cables 14 retained therein.

Similarly, as shown in FIGS. 6C-6D, each clip 12 snap-fits to an adjacent clip 12. For this purpose, the clip 12 includes a plurality of bull nose shaped plugs 24 formed on its lower side 22, each cell 16 being flanked by a pair of plugs 24. The plugs 24 are adapted to interlock with a corresponding plurality of shoes 26 formed in upper side 23, opposite the lower side 22, of the next clip 12 below, if any. The shoes 26 are cavities having the same bull nose shape as the plugs 24, but with a very small clearance, so as to be operative to receive the plugs 24 while being sufficiently tight to resist loose longitudinal sliding of a clip 12 relative to other clips 12 above or below it. In one embodiment for a 6 mm nominal cable diameter, such clearance for a polypropylene clip would be on the order of 0.02 to 0.05 millimeters.

Each shoe 26 has a top opening that is slightly narrower than the widest dimension of the corresponding plug 24, the top opening being flanked by a pair of rounded ribs 28. The shoes 26 include an end shoe 26 at each of the opposite lateral ends of the clip 12 and interior shoes 26 disposed between the pair of end shoes 26. For each interior shoe 26, one of the ribs 28 is formed on an upper wall 27 of each of two neighboring cells 16 that flank the interior shoe 26. For each end shoe 26, one of the ribs 28 is formed on an upper wall 27 of a neighboring cell 16 disposed in a laterally inward direction from the end shoe 26, and the other of the ribs 28 is formed on an end wall 29 that defines one of the lateral ends of the clip 12. Each cell upper wall 27 thus comprises a pair of ribs 28, each rib 28 defining one of the lateral boundaries of the top opening of one of the two shoes 26 disposed to each lateral side of the cell upper wall 27. When two clips 12 are snapped together, a cell upper wall 27, having a lateral dimension extending from a laterally outer side of one of its ribs 28 to a laterally outer side of the other of its ribs 28, is received between a pair of cell lips 30 corresponding to a cell 16 of the next clip 12 above, the cell lips 30 being opposed convex features of the two plugs 24 at each lateral side of the cell 16. In a relaxed state of the clip 12, the cell lips 30 of a given cell 16 are spaced apart by a lateral distance to define a mouth 31 extending laterally therebetween, the mouth 31 having a lateral dimension that is smaller than the lateral dimension of the upper wall 27 of the next clip below, so that insertion of the upper wall 27 into the mouth 31 requires the structure of the cell 16 of the clip 12 above to flex so as to expand the mouth 31, until the ribs 28 are inserted past the lips 30 so as to permit the mouth 31 to contract and the structure of the cell 16 to relax. An indefinite number of clips 12 may thus be connected in series to form a one-dimensional stack of clips 32, as shown in FIGS. 1A and 3, which is adapted and configured to support a two-dimensional bundle 34 of wires or cables 14, as shown in FIG. 1A.

To promote the interlocking connection of a pair of clips 12, each clip 12 comprises features to facilitate its flexing to expand the openings between opposed pairs of cell jaws 20 and cell lips 30 and the openings of the shoes 26. With respect to cell jaws 20 and cell lips 30, the closed upper side of each cell 16 has relatively thin transverse cross sections, to permit flexing of the clip 12 along this region, so as to expand the widths of the respective transverse openings between the corresponding cell jaws 20 and between the corresponding cell lips 30 (the latter opening being the cell mouth 31. Similarly, opposite the transverse opening of each shoe 26, there is formed a shoe flex groove 35, which provides relatively thin transverse cross sections of the clip 12 opposite the opening of the shoe 26 to facilitate flexing of the clip 12, so as to widen the opening of the shoe 26 to receive a corresponding plug 24 of clip 12 to be connected below.

In an embodiment of a method according to this disclosure, an empty clip 12 is connected below a clip 12 that is populated by cables 14, in the manner illustrated in FIGS. 6A-6B. When a populated clip 12 is approached by the empty clip 12, the clearance within the cells 16 of the empty lower clip 12 permits it to flex more, and with less effort, to open up a shoe 26 to receive a corresponding plug 24 of the clip 12 above. The shoe 26 comprises an opening and rounded features that permit easy engagement with the corresponding plug 24, while the slight angle assumed by the remainder of the lower clip 12 further eases the entry of the next plug 24 into the next shoe 26.

The action then proceeds with the connection of successive mating pairs of a plug 24 and a shoe 26, illustrated in FIG. 6A as being ordered from left to right. The result is analogous to the manner of operation of a zipper, and, like a zipper, any orthogonally directed effort to separate or join the two rows, applied elsewhere than at the outer edge of a horizontally outermost plug/shoe pair to be joined or separated, is met with significant resistance, while "peeling" the rows apart from a horizontally outer end inward, or merging rows together by connecting their mating features in order from one end toward the opposite end of each clip, makes the separation and joining of clip rows 25 very easy, requiring only low amounts of force.

In systems as disclosed herein, a clip stack 32 and corresponding bundle 34 may be formed of an indefinite number of clips 12 and rows 25, within practical limits of strength and/or stability. Such limits may be extended, however, through the use of additional stabilizing structure, such as a binding frame 48 of a heavy-duty embodiment of a cable management system 10', which is described in more detail further below with reference to FIGS. 9A-10.

As noted above, although each wire or cable 14 is squeezed into its respective cell 16, once there, it is relatively loose until the next lower clip 12 is connected to the stack 32. This enables clips 12 to be slid up and down along a multi-cable run without disrupting the order of the cables 14 from left to right. However, when the next row 25 snaps into place from underneath, a contact region 36 formed on the convex upper side of each cell 16 serves to push the cable 14 in the cell 16 above against a ceiling of that cell 16, effectively gripping the cable 14 without crushing it, as illustrated in FIGS. 6C and 6D. The surface of the contact region 36 may be a uniformly curved bump extending along the length of the cell 16, as illustrated in the drawings, or it may be textured, comprising, for example, a pattern of ribs, ridges, or dimples. The contact region 36 may be convex as shown, or alternatively, it may be a raised concave projection (not shown), so as to conform to the convex periphery of a cable 14 and thereby increase its contact area therewith. The clips 12 may still be slid apart longitudinally, but with more difficulty due to frictional resistance between the clips 12 and the gripped cable 14.

Two interconnected clips 12 can be easily "peeled" apart, i.e., separated by first pulling an outer end of the lower clip 12 vertically away from the upper clip 12 to disengage an outermost plug 24 of the upper clip 12 from an outermost shoe 26 of the lower clip 12, thereby permitting the lower clip 12 to flex at an advancing position along its length, so as to expand the openings of subsequent shoes 26 to permit removal of the corresponding plugs 24, generally reversing the procedure illustrated in FIGS. 6A-6B. However, the two clips 12 cannot be readily pulled apart by vertical tension that is initially applied anywhere but at their horizontal ends.

In another embodiment of a method according to this disclosure, each row 25 is separately assembled and then snapped into place with rows 25 above and/or below, the clips 12 being adapted and configured to flex sufficiently to be snapped together even when the cells 16 of the lower clip 12 are populated with cables, albeit with greater effort than required to connect a lower clip 12 that is empty of cables. This permits a user the freedom to organize cables or wires and insert them securely into their clips 12 while making final adjustments before snapping clips 12 into each other.

In another embodiment of a method according to this disclosure, one or more cables having a cable diameter smaller than the cable diameter D corresponding to a cell 16 may be retained loosely, or multiple smaller cables (e.g., multiple single-wire or multi-wire cables) compactly, in a single cell 16 (not shown). Thus, although the cables 14 held by each clip 12 are of the same size as illustrated, cables held in a given clip 12, or even in a given cell 16, may be of different sizes. In some cases of a plurality of smaller cables being retained compactly in a cell 16, the plurality of cables can freely slide longitudinally through the cell 16 (and conversely/put another way, the cell 16 can freely slide longitudinally along the length/run of the plurality of cables) when no successively lower clip 12 is connected below the cell 16, and when a successively lower clip 12 is connected, the plurality of cables are gripped between the cell 16 and corresponding contact region 36 of the lower clip 12 so as to frictionally resist such relative longitudinal movements of the plurality of cables or the cell 16, as described above for a single cable 14 of diameter D being frictionally gripped within a channel 18 of corresponding channel diameter D'.

Since a clip stack 32 according to this disclosure has an open bottom side, cables 14 need not be threaded through anything as successive rows 25 are added. Instead, they can simply be snapped into respective cells 16 of their respective rows 25 at final assembly time. If, as permitted by the design, the relative position of each cable 14 is preserved throughout a cable run, it becomes easy to maintain awareness of each cable's identity. In addition, clips can be ganged together in longitudinal series when first inserting each wire, after which each clip of the longitudinal series can be slid along the wires that it retains to a desired location apart from the other clips of the longitudinal series, for assembling and/or mounting a clip stack corresponding to the respective clip, while preserving the order integrity of the arrangement. The foregoing need not exclude any other means of cable identification, such as by color or other coding system.

Turning to FIGS. 1B, 7A and 7B, a top cap 38 and a bottom cap 40 of the disclosed system are now described. A clip stack 32 may be finished by connecting top and bottom caps 38, 40 to its respective top and bottom sides, thus providing a smooth upper and lower face to the finished stack 32, as shown in FIG. 1B. The caps 38, 40 can also provide greater resistance to flexion in their respective frontal planes than the clips 12, so as to enhance the strength and stability of the finished stack 32. For example, the caps 38, 40 can be formed of a stiffer material than the clips 12 and/or in shapes providing greater resistance to flexion than the shapes of the clips 12. In embodiments, the caps 38, 40 may be formed of among other materials, acrylonitrile butadiene styrene (ABS) or polycarbonate (PC) or a blend (PC/ABS) of the two. With reference to FIG. 8, in another embodiment, a bottom cap 40' comprises connecting features analogous to those of the bottom cap 40, for connecting the bottom cap 40' below a populated clip 12 or clip stack 32, while the bottom cap 40' further includes a flat bottom surface and a pair of mounting flanges 41. Each mounting flange 41 includes one or more holes 43, the holes 43 extending vertically through the flange 41. Each hole 43 is adapted to receive a suitable fastener (not shown) for mounting the bottom cap 40' flush against a flat support surface (not shown). In practical terms, clips 12 supporting larger diameter wires and cables 14 may have two or three holes 43, while clips 12 for small diameter wires and cables 14 might have only one hole 43 on each mounting flange 41. It will be noted that such a flat support surface may be horizontal, vertical, or otherwise oriented with respect to a geospatial or other spatial frame of reference, the term "bottom" and other dimensional terms being applied herein only for purposes describing structural features of the presently disclosed systems in spatial relation to one another. In other embodiments, a top cap (not shown) may include a flat top surface that extends over and between a pair of mounting flanges analogous to the mounting flanges 41. In other embodiments (not shown), a top and/or a bottom cap may incorporate mounting flanges that are oriented vertically, such as upwardly from either or both ends of a top cap and/or downwardly from either or both ends of a bottom cap, and such flanges may include holes for receiving horizontally inserted fasteners. This may be beneficial, for example when only a horizontal support surface is available for mounting a clip stack at a first position along the run of a cable bundle, and only a vertical support surface is available for mounting a clip stack at a second position, but where it is nonetheless desired to orient the clips of each stack in the same direction. For example, for cable identification purposes, it may be desired for a given cable to be retained at the same row- and column-indexed cell position in each of the two stacks, without relatively rotating the stacks, so as to avoid twisting the cable bundle.

As shown in FIG. 7A, a lower side of the top cap 38 comprises connecting features analogous to those of the lower side 22 of each clip 12, namely, a plurality of plugs 24 and mouths 31 arranged in alternating series across its horizontal width. However, top cap 38 lacks cable channels 18 and instead includes mouth flex grooves 42 to facilitate flexion of the top cap 38 opposite its mouths 31. Similarly, an upper side of the bottom cap 40 comprises connecting features analogous to those of the upper side 23 of each clip 12, namely, a plurality of shoes 26 arranged in series across its horizontal width. The bottom cap 40 additionally contains shoe flex grooves 35 analogous to those of each clip 12.

In addition, the bottom cap 40 comprises a plurality of round holes 44 formed therein, below the position of each cell plug 28, the round holes 44 thus being similarly positioned to the cells 16/cable channels 18 formed in a clip 12. However, unlike the cable channels 18 defined by the cells 16 of clips 12, the primary function of the round holes 44 is not to accommodate a cable or wire, but rather to reduce the transverse cross sections of the bottom cap 40 that extend through the holes 44, so as to promote more uniform flexibility of the bottom cap 40 across its horizontal width, and thus to facilitate its flexing to expand its shoes 26 to receive corresponding plugs 24 of a lowermost clip 12 of a clip stack 32, without flexion and associated material stresses being excessively concentrated in the regions of its flex grooves 35. In other embodiments, the round holes 44 are adapted and configured to mate with the lugs of an accessory for use with the system 10, such as the lugs 82 of a waterfall elbow tray 76 described in more detail further below, with reference to FIG. 15. The lugs 82 may beneficially have approximately the same diameter D as the cables retained by a clip stack 32 which they are intended to receive, or a slightly larger diameter, so that the cells 16 of clip 12 (or of another component of like cross section) may tightly snap directly onto the lugs 82, for an alternative mode of connecting the clip stack 32 to the accessory, but, in some embodiments, the lugs 82 may be of a substantially different diameter. Thus, while round holes 44 may be adapted and configured to receive an additional bottom row of cables 14, to be fed therethrough longitudinally rather than snapped in orthogonally, they need not be so adapted and configured. In other embodiments, a bottom cap may comprise holes of other cross-sectional shapes, or it may omit holes 44 altogether and instead include other types of flexibility enhancing geometric features than through holes, such as cavities, depressions, and/or reduced exterior dimensions, and/or be formed of a material or materials so as to flex as desired when formed into a shape that is desired for reasons other than flexibility.

With reference to FIGS. 9A, 9B, and 10, a heavy-duty cable management system 10' according to another embodiment of this disclosure will now be described. The cable management system 10' comprises a reinforced clip stack 46 retaining a two-dimensional bundle 34' of wires or cables 14'. The reinforced clip stack 46 includes a stack 32 of clips 12 as previously described, bound by a binding frame 48 that extends continuously around a periphery of the stack 32 that includes the top, bottom, and lateral sides of the stack 32. The binding frame 48 includes a top section, a bottom section, and lateral connecting members connected between the top section and the bottom section, the binding frame being adapted and configured to permit manual adjustment of tension in the lateral connecting members so as to adjust a vertical clamping force applied to a clip stack between the top section and the bottom section. More particularly, the binding frame 48 is formed by a heavy-duty top cap 50 and a heavy-duty bottom cap 52. The heavy-duty top cap 50 comprises a top section 54 that is generally analogous to the top cap 38 and a pair of integral serrated straps 56, the serrated straps 56 being connected to opposite lateral ends of the top section 54 and extending downwardly therefrom. In turn, the heavy-duty bottom cap 52 comprises connecting flanges 57 at each of its opposite lateral ends, a respective counter-serrated hole 58 being formed in each connecting flange 57, the serrated straps 56 being adapted and configured to insert through and lock into the counter-serrated holes 58. The respective serrations and counter-serrations may be of different kinds, including a type that is common in zip-ties/cable ties, as illustrated in the drawing figures. The serrated straps 56 may be joined by means of a thinned out connection (not shown) to the top section 54, thereby permitting the serrated straps 56 to benefit from the membranous hinge thereby formed and further allowing more easy rotation in the lateral plane while permitting the top cap 50 to be formed more easily through conventional methods such as injection molding.

The holes 58 have counter-facing teeth to those of the straps 56, so that the straps 56 can be manually pushed through the holes 58 but resist being withdrawn, whereby the binding frame 48 can be adjusted to clamp the reinforced clip stack 46 between the heavy-duty top cap 50 and the heavy-duty bottom cap 52 with a desired amount of clamping force. Each hole 58 further comprises a spring tab 59 having a bump 60 formed thereon opposite the counter-facing teeth, the spring tab 59 being adapted and configured to flex laterally outwardly to permit the strap 56 to be displaced outwardly as the oblique faces of the respective serrations of strap 56 are cammed laterally outwardly by those of the counter-serrations of the hole 58 while the strap 56 is being introduced, and when a tooth of the serrations clicks past a tooth of the counter serrations, to return laterally inwardly to a relaxed position, where the bump 60 in the relaxed position engages the strap 56 so as to retain the horizontal faces of the respective serrations and counter-serrations in opposed alignment, so as to obstruct the withdrawal of the strap 56 past a position at which the opposed horizontal faces meet. In embodiments not shown, a connecting flange may further comprise an enclosure around a spring tab formed therein, the enclosure partially or fully obstructing access to the spring tab once a serrated strap is introduced therethrough, so as to protect the spring tab from damage or accidental disengagement. Once the straps 56 are inserted through the counter-serrated holes 58 and adjusted to a desired tension, their excess lengths extending below the connecting flanges may be trimmed away, as in a common practice in the use of zip-ties. In another embodiment not shown, a heavy-duty cable management system may use a bottom cap that includes mounting flanges analogous to mounting flanges 41 of the surface-mounting bottom cap 40' described above, further including counter-serrated holes formed in the mounting flanges, to facilitate mounting a reinforced clip stack to a flat support surface.

With reference to FIGS. 11-13, a cable management system 10" according to another embodiment of the present disclosure is here described. The system 10" includes flanged clips 12" interconnected to form a flanged clip stack 32", the flanged clip stack 32" being capped by a flanged top cap 38" and a flange-receiving bottom cap 40". The flanged clips 12" flanged top cap 38", and flange-receiving bottom cap 40" include connecting features analogous to those of the clip 12, top cap 38, and bottom cap 40 as previously described, so as to interconnect in a manner substantially as previously described for the stack 32 of the system 10. In addition, the flanged clips 12" and the flanged top cap 38" include orthogonal flanges 62, the orthogonal flanges 62 being connected to the flanged clips 12" at each of two longitudinal ends of each plug 24 and extending downwardly and laterally outwardly from the periphery of each plug 24 at its longitudinal ends. In the assembled stack 32", and each flange 62 of a clip 12" is adapted and configured to overlap a corresponding recessed longitudinal end face 64 of a connected successively lower clip 12", or such a recessed longitudinal end face 64 of the bottom cap 40". The recessed longitudinal end faces 64, which include the longitudinal ends of the corresponding shoes 26 so that the shoes 26 do not impinge the orthogonal flanges 62 when connecting clips 12", are recessed from the respective longitudinal ends of the respective clip 12" or bottom cap 40" by the longitudinal thickness of the flanges 62 and comprise orthogonal areas corresponding to those of the respective flanges 62, in such a manner that the clips 12" interconnect so as to form substantially continuously flush, front and back (back not shown) longitudinal end faces 66 of the stack 32". The overlap of the flanges 62 of a flanged clip 12" or flanged top cap 38" with the recessed longitudinal end faces 64 of a below-connected flanged clip 12" or flange receiving bottom cap 40" is operative to lock each interconnected component of the flanged clip stack 32" in a fixed longitudinal position relative to its other components.

In addition, at each longitudinal end of each cell 16", a corner 68 of each of two flanges 62 is adapted and configured to overlap the orthogonal cross section of a cable channel 18" on at least one of the lateral sides of the corresponding shoe 26, so as to slightly impinge an outer perimeter of a cable 14 retained in an adjacent cable channel 18" of the flanged clip stack 32" and being of the slightly smaller cable diameter that corresponds to the cable channel diameter of the cable channel 18", as best seen in FIG. 12. Thus, each wire 14 is impinged by a flange 62 at four points, two on the clip 12" front face and the other two on the corresponding back face, further contributing to the delayed-locking frictional resistance provided by the wire 14 being gripped between the ceiling of the cell 16" and the contact region 36 of the clip 12" below, substantially as previously described with reference to the system 10. Impingement locations I of the corners 68 and contact region 36 on a cable 14 are circled in FIG. 12.

With reference to FIGS. 14A-14C, an adapter cap 70 in accordance with another embodiment is now described. The adapter cap 70 has a top side 72 and a bottom side 74. As seen in FIG. 14A, formed on the top side 72 of the adapter cap 70 are connecting features analogous to the shoes 26 of the bottom cap 40 and the top side 23 of the clip 12 of the system 10. These connecting features are operative to connect a first clip 12a of a first size above the top side 72 of the adapter cap 70, as shown in FIG. 14B. Likewise, formed on the bottom side 74 of the adapter cap 70 are connecting features analogous to the plugs 24 30 of the top cap 38 of the system 10, operative to connect a second clip 12b of a second size below the bottom side 74 of the adapter cap 70, as also shown in FIG. 14B. The first size is different from the second size. As illustrated in the drawing figures, the first clip 12a is smaller than the second clip 12b. In other embodiments, the first clip is larger than the second clip. In systems and methods according to embodiments of this disclosure, a first stack 32a, which supports a first bundle 34a of cables 14a of a first diameter, can thus be connected by the adapter cap 70 to a second stack 32b, which supports a second bundle 34b of cables 14b of a second diameter, the second diameter being larger than the first diameter. In an embodiment, the first diameter is 4 mm and the second diameter is 6 mm. In other embodiments not shown, the first diameter is larger than the second diameter.

Systems according to this disclosure permit many useful accessories to complement the clips and clip stacks. Examples include, but are not limited to, accessories for simple bend management, rack mounting of cable trays, step-up/step-down adapters (such as the adapter cap 70 described above) for co-routing groups of cables of different sizes, and flanged clips (or caps, such as the surface-mounting bottom cap 40' described above) for direct fastening to surfaces. In addition, because all accessories and cables are uniquely tied to each other, there is mutual support, making fixed mounting of trays, elbows and bridge fittings not absolutely necessary in order to retain path control of a bundle.

An embodiment of an accessory according the present disclosure is the waterfall elbow tray 76 illustrated in FIG. 15. The waterfall elbow tray 76 is adapted and configured to constrain the bend radius of a cable bundle supported therein to a minimum of that of a base surface 78 of a channel 80 defined by the tray 76. The tray 76 further comprises lugs 82 at each end of the base surface 78, the lugs 82 protruding beyond the ends of the base surface 78 and the channel 80 and being adapted and configured to tightly fit the round holes 44 of the bottom cap 40 of the system 10. The bottom cap 40 thus may serve as an adapter 84 for connecting the clip stack 32 of the system 10 to the tray 76. Thus, further illustrated in FIG. 15 are the tray 76 with the bottom cap 40/adapter 84 connected to the lugs 82 at each end of the tray 76, the clip stack 32 in turn connected to its bottom cap 40/to the adapter 84 at each end of the tray 76, and a bundle 34 of cables 14 in turn being retained in the respective clip stacks 32 and routed through the channel 80 of the tray 76 so as to maintain, as a minimum bend radius of the cables 14, at least the minimum radius of the base surface 78 of the tray 76.

Figure 19:
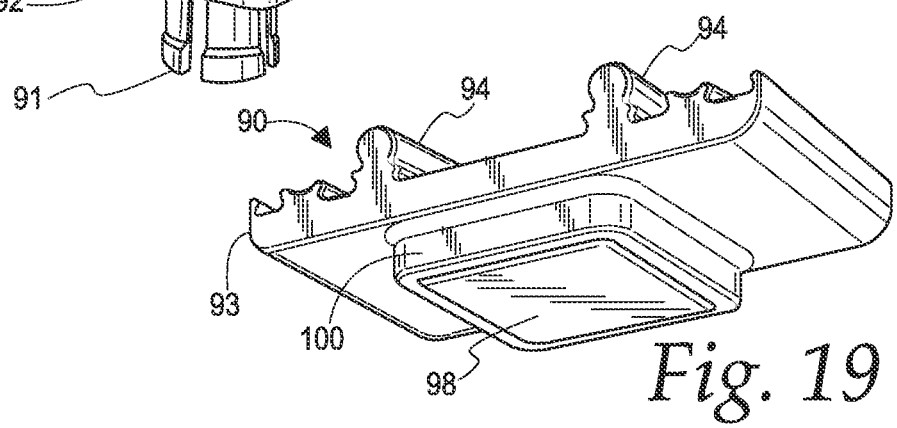
FIG. 19 is a perspective view of an accessory magnetic mount adapter according to an embodiment.

Additional embodiments of accessories according to this disclosure are illustrated in FIGS. 16-19 as a bridging adapter clip 86 (shown in FIG. 16) and accessory mounting adapters, the accessory mounting adapters including an accessory-rack mount adapter 88 (shown in FIG. 17), and an accessory-magnetic mount adapter 90 (shown in FIG. 19).

Figure 16:
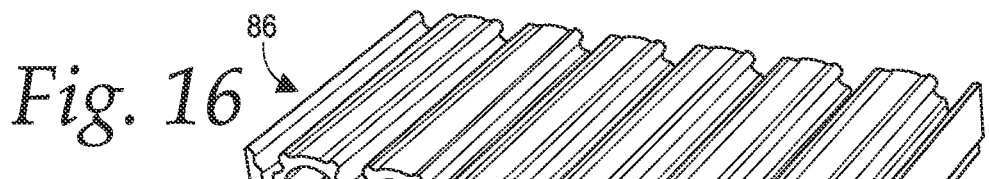
FIG. 16 is a perspective view of a bridging adapter clip according to an embodiment.

The bridging adapter clip 86 shown in FIG. 16 has the same profile as the clip 12 of system 10, but may have a substantially greater length, such as a length of about six times the nominal cable diameter D associated with the clip 12. In an embodiment, the length of the bridging adapter clip 86 corresponding to a 3 mm cable diameter standard clip 12 is 18 mm. The bridging adapter clip 86 includes cells 87 analogous to cells 16 of the standard clip 12.

Figure 17:
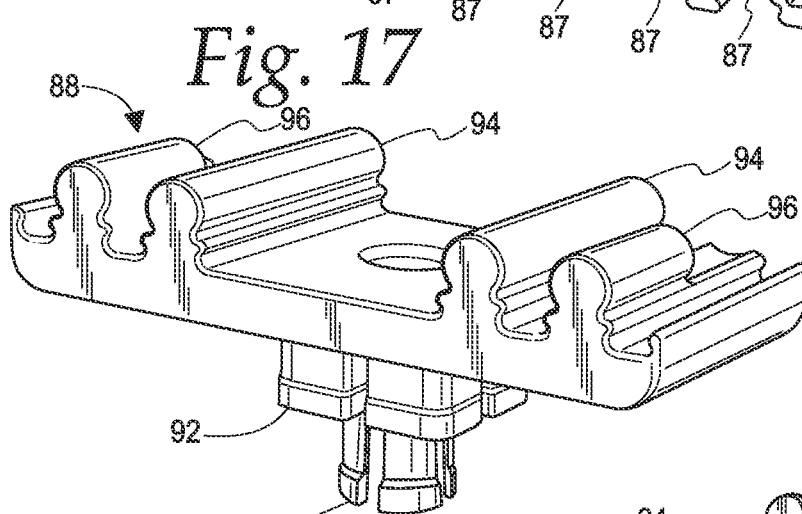
FIG. 17 is a perspective view of an accessory rack mount adapter according to an embodiment.

The accessory rack mount adapter 88 shown in FIG. 17 has formed on its bottom side a round snap clip boss 91 and a square snap clip boss 92, which are operative to connect either to standard-sized round or standard-sized square holes of respective standard 19-inch electronic system racks (not shown) such as commonly found in computer data centers and diverse other multi-component electrical and electronic systems. On the top side of the accessory rack mount adapter 88 are formed projections 94 and truncated projections 96, each of projections 94 and 96 having an end with a round profile substantially matching the size and shape of that of the lugs 82, the projections 94 being adapted and configured to abut the end of the channel 80 of the tray 76 when the truncated projections 96 abut the ends of an outer pair of the lugs 82 of the tray 76. When the accessory rack mount adapter 88 is so oriented, the cells 87 of the bridging adapter clip 86 may be simultaneously snap-fitted onto the projections 94, truncated projections 96, and lugs 82, so as to connect the accessory rack mount adapter 88 to the tray 76, while a top side of the bridging adapter clip 86 includes connecting features analogous to those of the top side 23 of the standard clip 12, so as to be operative to connect to a standard clip stack 32 as illustrated in FIG. 18.

Figure 18:
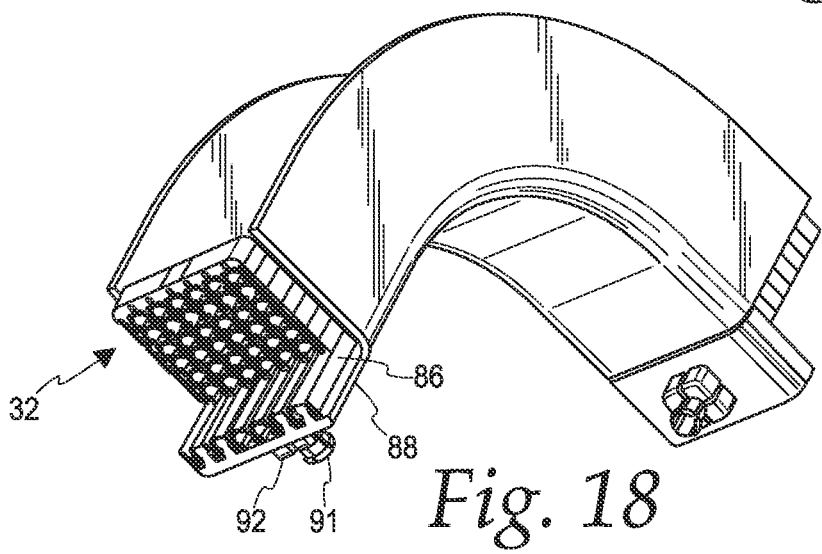
FIG. 18 is a perspective view of the bridging adapter clip shown in FIG. 16 used in conjunction with the accessory rack mount adapter shown in FIG. 17 to mount and interconnect clip stacks and an accessory, according to an embodiment.

The accessory magnetic mount adapter 90 shown in FIG. 18 has an adapter body 93 with a magnet 98 on its bottom side, the magnet 98 being retained in a walled cavity 100 of the adapter body 93 and bonded to the bottom side of the adapter body 93. The adapter body 93 has formed on its top side the same projections 94 and truncated projections 96 (not shown) as formed on the top side of the accessory rack mount adapter 88. Thus, the accessory magnetic mount adapter 90, in conjunction with the bridging adapter clip 86, may be used to magnetically mount a clip stack 32 and connected tray 76 (or other similarly lugged accessory) to a magnetically attracted support surface, in a like manner as shown in FIG. 18 for the accessory rack mount adapter 88.

The preceding description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claims set forth below. In addition, although narrow claims may be presented below, it should be recognized that the scope of this disclosure is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional disclosures are not dedicated to the public and the right to file one or more applications to claim such additional disclosures is reserved.

What is claimed is:

1. A cable management system comprising
a plurality of separably interconnectable clips;
each of the clips comprising:
    a one-piece clip body, the clip body having a first lateral end, a second lateral end, a first longitudinal end, a second longitudinal end, a top side, and a bottom side, the clip extending in a lateral dimension from the first lateral end to the second lateral end, the clip extending in a longitudinal dimension from the first longitudinal end to the second longitudinal end, the clip extending in a vertical dimension from the bottom side to the top side, the lateral, longitudinal, and vertical dimensions being orthogonal to one another;
    a plurality of cells, the plurality of cells forming a corresponding plurality of cable channels, each of the cells having a cell wall extending over a length and around a portion of a perimeter of the corresponding cable channel, the cable channels being spaced apart along the lateral dimension in a one-dimensional cable channel array, each of the cable channels having a cable channel axis extending in the longitudinal dimension and a cable channel diameter perpendicular to the cable channel axis, the cable channel axis defining radial directions perpendicular to the cable channel axis, each cable channel having a peripheral opening on the bottom side of the clip;
    each cell being adapted and configured to receive a corresponding cable of circular cross section, the cable having a corresponding cable diameter, the cable diameter being smaller than the cable channel diameter to accommodate the cable in the cable channel without interference between the cable and the cell when the clip is not connected to a another of the clips;
the clips being interconnectable in a vertically stacked series to form a clip stack comprising a topmost clip and at least one successively lower clip, a top side of each successively lower clip of the stack being connected to a bottom side of a preceding higher clip of the stack, the one-dimensional cable channel arrays of the clips in the clip stack being spaced apart vertically along the vertical dimension to form a two-dimensional cable channel array, the top side of each successively lower clip in the stack comprising a plurality of contact regions corresponding to the plurality of cells of the preceding higher clip, each contact region of the successively lower clip being adapted and configured to cooperate with the corresponding cell of the preceding higher clip such that, when the corresponding cable is retained in the corresponding cable channel of the preceding higher clip, the contact region and the cell are configured to form an interference fit with a vertical diameter of the cable wherein the cable is frictionally gripped between the contact region and the cell.

2. The cable management system of claim 1 wherein, when the clip is not connected to a successively lower clip and the cable is retained in one of the cable channels of the clip, a radial clearance is provided between the corresponding cell and the cable to permit the cell to slide longitudinally along a length of the cable.

3. The cable management system of claim 1 wherein the peripheral opening of each cell has a lateral width smaller than the cable diameter of the corresponding cable so as to permit snapping the cable into the corresponding cable channel through the peripheral opening while resisting escape of the cable from the cable channel through the peripheral opening.

4. The cable management system of claim 1 wherein each clip has uniform cross sections perpendicular to the longitudinal dimension over at least a portion of a length of the clip body.

5. The cable management system of claim 4 wherein the clip body of each clip has uniform cross sections perpendicular to the longitudinal dimension over the length of the clip body.

6. A cable management system comprising
a plurality of separably interconnectable clips;
each of the clips comprising:
a one-piece clip body, the clip body having a first lateral end, a second lateral end, a first longitudinal end, a second longitudinal end, a top side, and a bottom side, the clip extending in a lateral dimension from the first lateral end to the second lateral end, the clip extending in a longitudinal dimension from the first longitudinal end to the second longitudinal end, the clip extending in a vertical dimension from the bottom side to the top side, the lateral, longitudinal, and vertical dimensions being orthogonal to one another;
a plurality of cells, the plurality of cells forming a corresponding plurality of cable channels, each of the cells having a cell wall extending over a length and around a portion of a perimeter of the corresponding cable channel, the cable channels being spaced apart along the lateral dimension in a one-dimensional cable channel array, each of the cable channels having a cable channel axis extending in the longitudinal dimension and a cable channel diameter perpendicular to the cable channel axis, the cable channel axis defining radial directions perpendicular to the cable channel axis, each cable channel having a peripheral opening on the bottom side of the clip;
each cell being adapted and configured to receive a corresponding cable, the cable having a corresponding cable diameter corresponding to the cable channel diameter;
the clips being interconnectable in a vertically stacked series to form a clip stack comprising a topmost clip and at least one successively lower clip, a top side of each successively lower clip of the stack being connected to a bottom side of a preceding higher clip of the stack, the one-dimensional cable channel arrays of the clips in the clip stack being spaced apart vertically along the vertical dimension to form a two-dimensional cable channel array, the top side of each successively lower clip in the stack comprising a plurality of contact regions corresponding to the plurality of cells of the preceding higher clip, each contact region of the successively lower clip cooperating with the corresponding cell of the preceding higher clip such that, when the corresponding cable is retained in the corresponding cable channel of the preceding higher clip, the cable is frictionally gripped between the contact region and the corresponding cell;
the clip body comprising a plurality of plugs formed on the bottom side and a plurality of shoes formed on the top side, the plugs being spaced apart along the lateral dimension so that the peripheral opening of one of the cable channels is disposed laterally between each neighboring pair of the plugs, the shoes being spaced apart along the lateral dimension so that an upper portion of one of the cell walls is disposed between each neighboring pair of the shoes, the plugs being operative to insertably connect to corresponding shoes of a successively lower clip to connect the successively lower clip to the clip stack.

7. The cable management system of claim 6 wherein each shoe has a top opening with a lateral width and the corresponding plug has a lateral width wider than that of the shoe top opening.

8. The cable management system of claim 7 wherein each plug is operative to connect to the corresponding shoe of the successively lower clip by snapping into the corresponding shoe.

9. The cable management system of claim 6 wherein the corresponding plugs and shoes are operative to frictionally engage each other when connected, so as to resist longitudinal movement of the preceding higher clip relative to the successively lower clip.

10. The cable management system of claim 7 wherein each of the successively lower clips is flexible in a frontal plane perpendicular to the longitudinal dimension to widen the shoe top openings, so as to reduce a vertical force needed to insert or remove each plug of the preceding clip through the corresponding shoe top opening of the successively lower clip when the successively lower clip is so flexed.

11. The cable management system of claim 6 further comprising a top cap and a bottom cap, the top cap having a lower side with top cap plugs formed thereon, the top cap plugs being operative to insertably connect to corresponding shoes of a topmost clip of the clip stack, the bottom cap having a top side with bottom cap shoes formed thereon, the bottom cap shoes being operative to connect to corresponding plugs of a bottommost clip of the clip stack by insertion of the bottommost clip plugs into the corresponding bottom cap shoes.

12. The cable management system of claim 11, the clips being formed of a first material, at least one of the top cap and the bottom cap being formed of a second material, the second material being stiffer than the first material.

13. The cable management system of claim 11 wherein the bottom cap further includes a flat bottom surface and a pair of mounting flanges, each mounting flange including at least one hole, each mounting flange hole extending vertically through the respective mounting flange.

* * * * *